US011252983B2

(12) United States Patent
Laux et al.

(10) Patent No.: US 11,252,983 B2
(45) Date of Patent: Feb. 22, 2022

(54) METHOD FOR OBTAINING VALUE-DETERMINING CONTENTS FROM FOODS

(71) Applicants: Unico-First AG, St. Gallen (CH); ZHAW—Zürcher Hochschule Für Angewandte Wissenschaften, Wädenswil (CH)

(72) Inventors: Roland Laux, St. Gallon (CH); Tilo Hühn, Schönenburg (CH)

(73) Assignees: UNICO-FIRST AG, St. Gallen (CH); ZHAW—ZÜRCHER HOCHSCHULE FÜR ANGEWANDTE WISSENSCHAFTEN, Wädenswil (CH)

( * ) Notice: Subject to any disclaimer, the term of this patent is extended or adjusted under 35 U.S.C. 154(b) by 453 days.

(21) Appl. No.: 16/070,986

(22) PCT Filed: Jan. 19, 2017

(86) PCT No.: PCT/CH2017/000006
§ 371 (c)(1),
(2) Date: Jul. 18, 2018

(87) PCT Pub. No.: WO2017/124201
PCT Pub. Date: Jul. 27, 2017

(65) Prior Publication Data
US 2019/0021379 A1    Jan. 24, 2019

(30) Foreign Application Priority Data

Jan. 19, 2016 (CH) .................. 00069/16

(51) Int. Cl.
*A23L 27/10*      (2016.01)
*B01D 11/02*      (2006.01)
(Continued)

(52) U.S. Cl.
CPC ............ *A23L 27/11* (2016.08); *A23L 33/105* (2016.08); *A23L 33/15* (2016.08); *B01D 11/02* (2013.01);
(Continued)

(58) Field of Classification Search
CPC ... C11B 1/04; C11B 9/025; C11B 1/10; A23L 33/15; A23L 33/105; A23L 27/11
See application file for complete search history.

(56) References Cited

U.S. PATENT DOCUMENTS

| 2,345,097 | A | * | 3/1944 | Buxton | .................. C11B 3/006 514/168 |
| 5,077,069 | A | * | 12/1991 | Chang | .................... A61K 8/553 426/330.6 |
| 2012/0184720 | A1 | * | 7/2012 | Rozenszain | ............. C11B 1/108 530/423 |

FOREIGN PATENT DOCUMENTS

EP        1228701 A1 *   8/2002   ............... A23L 5/43

OTHER PUBLICATIONS

"Essential Oil Shelf Life". Available online at https://blog.planttherapy.com/blog/wp-content/uploads/2014/05/New-Shelf-Life.pdf (Year: 2014).*

(Continued)

*Primary Examiner* — Erik Kashnikow
*Assistant Examiner* — Assaf Zilbering
(74) *Attorney, Agent, or Firm* — Finch & Maloney PLLC (57) ABSTRACT

The invention relates to a method for obtaining value-determining contents, such as flavouring substances, vitamins, and polyphenols, from foods (13), having the following steps: a) providing a food (13), b) adding a plant oil (15) as an extractant, c) grinding the food (13) and the plant oil (15) into a mash (21), and d) separating the mash into an extraction phase, which is an oil phase (25), and a solid phase (29) as a raffinate phase. The food (13) and the plant (Continued)

oil (19) are ground very finely, said grinding process being defined in that the food (13) together with the plant oil (15) is ground until the oil phase (25) has an average particle size of less than 300 μm, preferably less than 100 μm, particularly preferably less than 20 μm.

17 Claims, 5 Drawing Sheets

(51) Int. Cl.
    *C11B 1/04*     (2006.01)
    *C11B 1/10*     (2006.01)
    *C11B 9/02*     (2006.01)
    *A23L 33/105*     (2016.01)
    *A23L 33/15*     (2016.01)

(52) U.S. Cl.
    CPC   *C11B 1/04* (2013.01); *C11B 1/10* (2013.01); *C11B 9/025* (2013.01)

(56) References Cited

OTHER PUBLICATIONS

"The Flottweg Tricanter® a High Quality and Versatile Decanter Centrifuge". Available online at https://www.flottweg.com/fileadmin/user_upload/data/pdf-downloads/Tricanter-EN.pdf (Year: 2012).*
"Ultra-fine friction grinding machine". Available online at www.masuko.com (Year: 2007).*

* cited by examiner

Figure 6

METHOD FOR OBTAINING VALUE-DETERMINING CONTENTS FROM FOODS

RELATED APPLICATIONS

This application is a National Stage Filing under U.S.C. § 371 of PCT International Application PCT/CH2017/000006, filed Jan. 19, 2017, which claims priority to Application Serial Number CH00069/16 filed Jan. 19, 2016, the contents of each of which is incorporated by reference herein in its entirety.

FIELD OF INVENTION

The invention relates to a method for obtaining value-determining ingredients such as flavouring substances and vitamins from foods and an essential oil, which is available from this method.

STATE OF THE ART

In the food industry there is a trend to be able to provide the essences and flavours of fresh food also in products that have a long shelf life. For a long shelf life, however, it is necessary to make the raw material to be processed as water-free as possible. Water is the basis of most bacteria and germs, which lead to a rapid spoilage of food. Therefore, attempts to preserve flavours are usually limited to powder.

Another way of preserving flavours is liquid-liquid extraction, in which flavours are selectively extracted from a pulp phase. Based on the extraction, a method is known from US 2012/0237910 A1 to obtain natural extracts. However, the process is very complex because a pulp phase is fermented before it is separated into a liquid phase and a pasty phase in a first centrifugation step. The liquid phase must be treated in a second centrifugation step to obtain the natural extracts.

EP 1 228 701 A1 discloses a method for obtaining native organic substances such as dyes or vitamins. The raw material is obtained by shredding it and adding water to form a mash. The lipophilic substances are extracted from the mash with the help of an extractant. In a centrifugal field, the mash is separated into two phases, namely an aqueous phase containing solid components and a liquid organic phase containing the lipophilic substances. The mash is finely ground. The optimum particle size is 500±250 µm. The liquid organic phase is filtered to obtain a resin. The shelf life of the extract is inevitably limited, as not only the valuable material(s) are extracted, but also some germs or microorganisms. This process is therefore unsuitable for achieving a long shelf life.

U.S. Pat. No. 4,246,184 describes a method for obtaining vegetable oil. Corn germs are ground with a hammer mill. The ground material is dried. In the next process step, the plant material is extracted from the ground material with an extractant such as hexane. To obtain a vegetable oil, the extract is conventionally separated from the extractant. During the grinding of the corn germs, however, partial oxidation and destruction of the ingredients, for example the flavouring substances, occurs. The quality of the extracted vegetable oil therefore suffers with the disclosed oil extraction.

Object of the Invention

From the disadvantages of the state of the art described, the object initiating the present invention results in the development of a method for the extraction of valuable substances, in which the value-determining ingredients, in particular flavouring substances and vitamins, are obtained as highly concentrated as possible while avoiding oxidation and have a good or long shelf life. The aim is to obtain flavours that are comparable to the flavours of fresh foods and come near their quality. Furthermore, the method should be as uncomplicated and easy to implement as possible.

DESCRIPTION

The solution to the object is to obtain ingredients such as flavouring substances, vitamins and polyphenols from foods by finely grinding the foods with the extractant, wherein the fine grinding is defined by grinding the food with the extractant for as long as it takes, until the oil phase has a mean particle size of less than 300 µm, preferably of less than 100 µm and especially preferably of less than 20 µm, and that the mash is separated in a three-phase separator into a solid phase, an oil phase for obtaining an essential oil and a aqueous phase.

The ultra-fine grinding leads to a surprising reduction in the germs and microorganisms present in the raw material. Accordingly, only ingredients with the above defined particle size distribution can enter the oil phase, as no larger particles are present in the ultra-finely ground mash. The indicated mean particle sizes in the oil phase therefore provide information as to whether the process was carried out correctly. In the event of insufficient comminution, the number of germs is only insufficiently reduced, as the germs are not subjected to sufficiently high shear stress. Sufficient comminution is also essential to achieve efficient extraction of the valuable substances, such as flavouring substances and vitamins, in the oil phase. When fresh plant material is ultra-finely ground, phytoalexins are also released, which inhibit or even inactivate the microorganism flora.

Surprisingly, the mash can be separated into three phases, as the formation of an emulsion is to be expected in the case of fine grinding. The formation of the aqueous phase has the advantage that germs can accumulate more in this phase and do not pass into the oil phase, as this is separated in the three-phase separator in the form of a three-phase decanter simultaneously with the aqueous phase and therefore has no contact with the oil phase. The three-phase decanter enables the mash to be separated into the oil phase, the aqueous phase and the solid phase with high separation efficiency. Therefore, little water is present in the oil phase and only few germs or enzymes can pass from the aqueous phase to the oil phase.

If the mash was separated in a two-phase separator, the separation efficiency would be significantly lower and there would also be a significant amount of water in the separated oil phase. Therefore, in the oil phase oil remains in contact with significantly more water than in the three-phase separation and germs and enzymes can pass into the oil and multiply or take effect. A two-phase decanter is therefore unsuitable for the requirement of a long shelf life of the oil phase or the essential oil obtained from it.

In a preferred embodiment of the invention, the extractant is a vegetable oil. This allows the fat-soluble valuable substances of the food to be enriched in the vegetable oil. The vegetable oil does not necessarily have to be added separately, as it may already be present in the food. It depends on the fat content of the food whether a separate addition of the vegetable oil is necessary or whether a sufficient addition of the vegetable oil by the food itself takes place.

In another preferred embodiment of the invention, the extractant is a salt solution or a sugar solution. The concentrated salt or sugar solution can inactivate the microorganisms by transferring water from the cells of the microorganisms into the concentrated solutions in order to achieve concentration compensation. The aqueous phase, which is available from the three-phase decanter, is enriched with sugar or salt and water-soluble value-determining ingredients. By drying, an essential salt or sugar can be produced from the aqueous phase, which is enriched with value-determining ingredients.

In another preferred embodiment of the invention, the extractant is a mixture of two or three of the above extractants, wherein the extractant is a vegetable oil, a salt solution and/or a sugar solution. In the other preferred embodiment of the invention, the extractant is a mixture of a vegetable oil and a concentrated salt solution or the extractant is a mixture of a vegetable oil and a concentrated sugar solution. It is also conceivable that the extractant is a mixture of a vegetable oil, a concentrated sugar solution and a concentrated salt solution. This allows several end products to be produced simultaneously.

In a preferred embodiment, an additive with an antioxidant effect, such as vitamin C, vinegar, oxalic acid or tocopherol, is added to the extractant. This allows the shelf life of the end products to be extended even further. The risk of the essential oil becoming rancid is very low due to the addition of the active substances.

In a preferred embodiment of the invention, supplements are added to the food in addition to the extractant (in particular the vegetable oil). These can be, for example, salts or acids to modify the pH value. Parts of plants rich in vitamin C for oxidation protection, such as sea buckthorn or acerola, can also be added to the food.

In a preferred embodiment of the method according to the invention, an oil phase is created after ultra-fine grinding of the mash, in which the fat-soluble ingredients such as flavouring substances and vitamins are extracted, an aqueous phase is created in which germs and other water-soluble substances are enriched and a solid phase is created in which the solid residues remain. The formation of the aqueous phase enables a further reduction of the germs in the oil phase in addition to ultra-fine grinding. Since neither water nor oxygen is present in the processed oil phase, the few germs present in the oil phase pose no danger, even during prolonged storage of the end product.

It has proved to be useful if the ultra-fine grinding is carried out in a toothed colloid mill whose milling gap is preferably smaller than 0.1 mm. The selection of this type of mill and the small milling gap lead to reliable ultra-fine grinding, which ensures the reduction of germs in the oil phase. It goes without saying that the size of the milling gap must be adapted to the food to be comminuted.

Advantageously the ultra-fine grinding is carried out in two stages so as not to overload the individual mills. It is preferred if the first grinding stage is carried out in a perforated disc mill and the second grinding stage is carried out in a toothed colloid mill. The perforated disc mill allows the starting materials to be pre-comminuted, whereas the toothed colloid mill is used for the ultra-fine grinding required to reduce the bacterial count. In order to achieve an even finer fine grinding of the mash, a third grinding stage can be provided, wherein a ball mill is preferably used in the third grinding stage. The three stages enable comminution down to a mean particle size of 20 μm in the oil phase. Instead of the toothed colloid mill, for example, a corundum disc mill can also be used.

The invention is also preferably characterized by the fact that the ultra-fine grinding is carried out at room temperature. Flavouring substances, polyphenols and vitamins are gently treated at these low temperatures between 17° C. and 25° C. and can be extracted in high concentrations into the extractant (especially the vegetable oil). Tests have shown that ultra-fine grinding with an extractant (especially vegetable oil) at 80° C. does not lead to a further reduction of the germs, compared to feeding the extractant (especially vegetable oil) at room temperature.

In a particularly preferred embodiment of the method according to the invention, the food is supplied fresh, preferably immediately after harvesting. The food is therefore made available particularly within less than 24 hours, preferably within less than 12 hours and particularly preferably within less than 6 hours. The valuable substances of the food are therefore not reduced by storage and preservation or deteriorated in their quality, but are extracted into the oil phase in the shortest time. The additional logistical effort is justified by the high quality of the essential oil obtained from the oil phase. However, it is also conceivable to use dried food as starting materials. The reduction of microorganisms in dried starting materials also works by means of ultra-fine grinding. Besides plants, meat or fish are also conceivable as foods.

It is advantageous if the oil phase is degassed and dewatered by vacuum deaeration. Regardless of the method used, it is advantageous to keep the water content in the oil phase as low as possible to stabilize the few germs or microorganisms present in the oil phase. This deprives the germs present in the oil phase of their basis of life.

It is appropriate if the temperature during fine grinding increases by 10 to 20° C. and preferably by 5 to 10° C. The foods, especially plants, are therefore ground at low temperature so that the valuable substances to be extracted can be extracted as unaffected by heat as possible.

In order to be able to subject the oil phase to a temperature treatment, the oil phase is subjected to a heat treatment and subsequent cooling. For example, by means of a heat exchanger, the oil phase can be brought quickly and gently to 80° C. or, depending on the germ load, up to 150° C. in order to further reduce the bacterial count. This makes it possible to additionally reduce the number of microorganisms in the oil phase by thermal treatment, if necessary. Furthermore, tyndallisation can take place if necessary. In tyndallisation heating and cooling takes place several times in succession to make spores germinate and to then inactivate them.

Alternatively or additionally, the oil phase can be subjected to a heat treatment, wherein the temperature of the oil phase is preferably increased to at least 40 or 80° C. and/or at most 100 or 150° C.

It is preferable to remove sediments and suspended solids from the oil phase in a 2-phase separator. This makes it possible to produce a clear end product in the form of the essential oil and to separate colloids formed during a temperature treatment.

As already mentioned, a reduction of the bacterial count and/or microbiological stabilisation is preferably achieved by ultra-fine grinding in the oil phase. This is of particular advantage, as no preservatives or other additives are required for a microbiologically harmless end product. In the end product designated as essential oil, no additives, in particular no preservatives, are added in addition to the extracted fresh valuable substances of the raw material.

Due to the formation and separation of the aqueous phase, the bacterial count in the oil phase is preferably reduced compared to the bacterial count of the oil phase in 2-phase separation. The reduction of germs in the oil phase is therefore carried out in two stages, on the one hand by ultra-fine grinding and on the other by separating the aqueous phase.

In another preferred embodiment of the invention, the concentration of Presumptive Bacillus cereus is reduced to less than 100 colony-forming units/g and the concentration of Enterobacteriaceae to less than 10 colony-forming units/g by forming and separating the aqueous phase and/or the ultra-fine grinding in the oil phase. The oil phase then has a very low concentration of bacteria and microbiological contaminants. The formation and separation of the aqueous phase in the three-phase separator therefore leads to a surprisingly high purity and long shelf life of the oil phase.

It is advantageous if the method extracts at least 90% of the fat-soluble vitamins present in the food into the oil phase. Since most of the vitamins contained in the food can be extracted into the oil phase by the method, an essential oil rich in fat-soluble vitamins can be produced by the method.

Advantageously the proportion of fat-soluble vitamins in the food, which are extracted into the oil phase increases as the degree of ultra-fine grinding increases. Experiments have shown, for example, that the vitamin K content in the oil phase can be increased by 30% if the average particle size is reduced from 660 μm to 80 μm.

Another aspect of the invention concerns an essential oil with an average particle size of less than 300 μm, preferably of less than 100 μm and especially preferred of less than 20 μm. Since the extracted ingredients in the essential oil are very small, the bacterial counts in the essential oil are very low and this is microbiologically harmless and durable without the need for additives.

It is preferred if the concentration of Presumptive Bacillus cereus in the essential oil is less than 100 colony-forming units/g and the concentration of Enterobacteriaceae is less than 10 colony-forming units/g. In terms of microbiology, the essential oil can thus retain a shelf life of at least 12 months.

It is advantageous if the concentrations of the aroma substances in the essential oil remain essentially stable at 20° C. to 40° C. for 20 days and preferably 40 days. Analyses have shown that, for example, during the extraction of fresh parsley in the essential oil, the flavouring myrcenes and (Z)-3-hexenyl acetate remained stable for 40 days shelf life test. This gives the essential oil a fresh, herbal taste even after 40 days. In the shelf life test of an essential oil with freshly extracted black pepper, the concentrations of all the flavouring substances analysed remained at least constant. For example, the concentration of limes, a-phellandrene and linalool was measured. In the corresponding concentration measurements with freshly extracted garlic, the concentrations of the aroma substances allyl sulphide and allyl disulphide typical of garlic also remained constant for 40 days.

A method for obtaining ingredients such as flavouring substances, vitamins and polyphenols from foodstuff is disclosed comprising the following steps: Preparation of a foodstuff; addition of an extractant (in particular a vegetable oil) to the foodstuff; grinding of the foodstuff and the extractant to a mash; and separation of the mash obtained preferably in a three-phase separator, in particular a three-phase decanter) into a solid phase, an oil phase and a aqueous phase. It is provided that said grinding (in particular ultra-fine grinding) and/or said separation is carried out so that the average particle size in the oil phase and/or an essential oil produced therefrom is less than 300 μm, preferably less than 100 μm and particularly preferably less than 20 μm.

Further advantages and features result from the following description of an embodiment of the invention with reference to the schematic illustrations.

Figure 1:
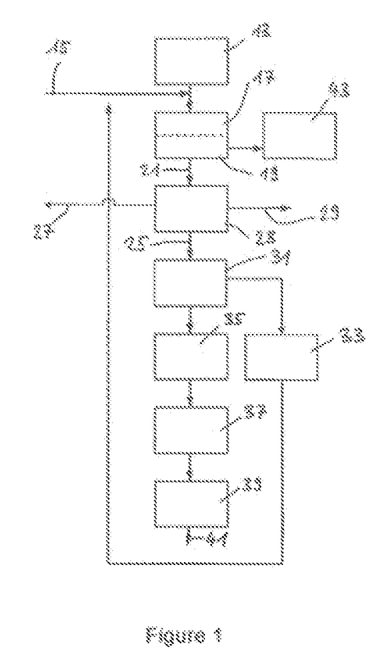
FIG. 1: a flowchart of a method for obtaining valuable substances such as flavouring substances and vitamins.

FIG. 1 shows a flowchart of a method for obtaining valuable substances, in particular flavouring substances, vitamins and polyphenols from fresh foodstuff. In particular, freshly harvested plants suitable for consumption, such as herbs, spices or vegetables, are processed as raw materials. Fruits are also conceivable as raw materials. It is particularly preferred if the plants are processed as freshly as possible in order to extract as many pure flavours as possible. Because through storage and preservation, plants inevitably lose their fresh and very own aroma. The time between harvesting the plant and processing should therefore be kept as short as possible. The plants processed as raw materials are marked with the reference numeral 13.

The plants 13 are washed and, together with a vegetable oil 15, subjected to an ultra-fine grinding process. If the plants 13 have a very low water content, water can optionally be added. The vegetable oil 15 is preferably a vegetable oil, which contains predominantly long-chain fatty acids, so that an undesired rancidity of the vegetable oil is prevented. For example, sunflower oil or rapeseed oil can be used. Within the scope of this application, ultra-fine grinding is preferably understood as grinding in a mill which leads to an average particle size of less than 300 μm in the oil phase. Within the scope of this patent application, the average particle size is preferably defined by all particle sizes contributing according to their volume fraction in the collective. The average particle size in the interval is weighted with the corresponding volume portion and all these weighted values are averaged arithmetically. According to a variant, the particle size can be determined by sieving, filtering or by laser photometer. Ultra-fine grinding is preferably carried out in two stages in order to achieve the desired particle size distribution (PGV) as quickly and reliably as possible. For example, the first grinding stage can be carried out in a perforated disc mill 17 and the second grinding stage can be carried out in a toothed coloid mill 19. The toothed colloid mill 19 is preferably equipped with a grinding gap of less than 0.1 mm in order to achieve the ultra-fine grinding. The size of the grinding gap must be adapted to the plants to be ground. Therefore, the size of the grinding gap can be other than 0.1 mm. Ultra-fine grinding exerts shear/impact and density stress on the microorganisms introduced, which leads to a reduction in living microorganisms.

Preferably the vegetable oil 15 is used at room temperature, since tests with a vegetable oil feed at 80° C. did not bring any improvements in the stabilization of microbiology. If microbiology is stable, the entirety of germs can no longer multiply, which is important for a sufficient shelf life. These experiments relating to microbiology are discussed in more detail below. The thermal inactivation of various enzymes leads to the preservation of value determining ingredients such as chlorophyll.

The intermediate product that leaves the ultra-fine grinding stage is called mash 21. Due to the ultra-fine grinding, it is surprisingly possible to separate the mash 21 into three phases. Rather, an emulsion formation would have to be expected. The three phases are separated by a 3-phase separator in the form of a three-phase decanter centrifuge 23. The mash 21 can be separated into an oil phase 25, an aqueous phase 27 and a solid phase 29.

In oil phase 25, the flavouring substances and essences of the starting material are extracted. The analysis of microbiology in oil phase 25 leads to surprisingly low concentrations of microorganisms or germs (see below). This is due to shear/impact and density stress during ultra-fine grinding and the absence of water and oxygen. Since neither water nor oxygen is present in oil phase 25, the number of microorganisms remaining in oil phase 25 remains stable, even if the end product is stored for a longer period of time.

In the oil phase 25 the fat-soluble ingredients of the raw material accumulate. Fat-soluble ingredients include flavouring substances and vitamins. Flavouring substances and vitamins, if present in the raw material, are particularly highly concentrated in the final product available from the oil phase 25. Polyphenols, although mainly enriched in the aqueous phase, are also present in the oil phase. The end product is therefore called essential oil.

The formation and separation of aqueous phase 27 means that germs can accumulate in the aqueous phase and are therefore depleted in the oil phase.

All ingredients of the starting material remain in the solid phase, which neither pass into the oil phase 25 nor into the aqueous phase 27.

The next method steps serve to optimize the quality of the final product (essential oil).

In the next method step, the oil phase 25 is separated from water residues and water-soluble volatile components and water-soluble flavouring substances in a vacuum deaerator 31. The separated aroma phase 33 can be used (preferably after further processing, for example by distillation, a cold trap or membrane process) for flavouring other products.

In the next method step, heat treatment 35 and subsequent cooling 37 of the oil phase can be provided so that the oil phase can be thermally treated if required.

A sediment formed in the oil phase 25 can be separated in a centrifuge 39.

The oil phase 25 can also be homogenized.

It is preferred if the end product is filled into a filling station in a bag-in-box packaging. In such packaging, contact of the product remaining in the bag with atmospheric oxygen is prevented even after a product has been removed. This makes the end product particularly durable.

The end product is rich in valuable substances such as flavouring substances, vitamins and polyphenols and is therefore called essential oil 41 or plant essence.

Microbiological stabilization in oil phase 25 is achieved by ultra-fine grinding and separation of the aqueous phase. In an embodiment, mint was processed as the starting material using the process according to the invention. The table below shows that the colony-forming units/g (CFU/g) were significantly reduced after ultra-fine grinding. Since the microbiological stability of mash 21 is already due to the microbiological reduction of the bacterial count, it is also conceivable to use the mash as a further end product as a highly aromatic paste 43. By separating the oil phase 25 from the aqueous phase 27, the aerobic germs in particular could be greatly reduced once again.

| | Germ | Germ load Raw material [CFU/g] | Germ load Mash [CFU/g] | Germ load Oil phase [CFU/g] |
|---|---|---|---|---|
| Mint | Aerobic germs Total germ number | 72,000,000 | 280,000 | 440 |
| | Presumptive *Bacillus cereus* | 200 | <100 | <100 |
| | Enterobacteriaceae | 2,200 | 60 | <10 |
| | *Escherichia coli* | <10 | <10 | <10 |
| | *Pseudomonas* sp. | — | — | — |
| | Coagulase pos. *Staph.* | <100 | <100 | <100 |

A test with leek has shown that the use of vegetable oil at room temperature did not lead to a change in the bacterial count in the oil phase compared to that at 80° C. This has the advantage that the method according to the invention can be carried out particularly gently at room temperature without increasing the bacterial count in the end product. Preference is given to keeping the process temperature low during ultra-fine grinding, as the temperature increases by a maximum of 15° C. during grinding.

| | Germ | Germ load Raw material [CFU/g] | Germ load Oil phase 80° C. [CFU/g] | Germ load Oil phase RT [CFU/g] |
|---|---|---|---|---|
| Leek | Aerobic germs Total germ number | 1,000,000 | <10 | <10 |
| | Presumptive *Bacillus cereus* | <100 | <100 | <100 |
| | Enterobacteriaceae | 65,000 | <10 | <10 |
| | *Pseudomonas* sp. | >15,000 | <100 | <100 |
| | Coagulase pos. *Staph.* | <100 | <100 | <100 |

Figure 2:
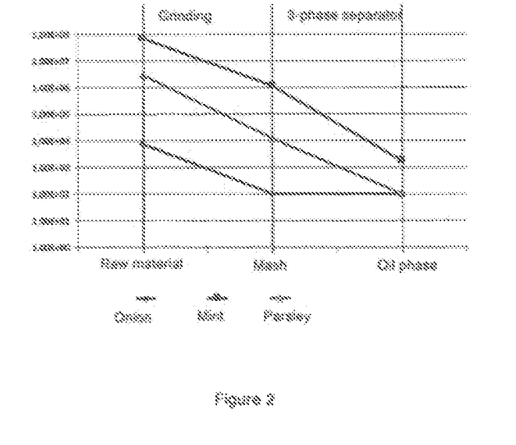
FIG. 2: a diagram which illustrates the decrease of the total bacterial count.

The diagram in FIG. 2 illustrates the reduction of the total bacterial count with onion, mint or parsley as raw material. It is shown that not only the ultra-fine grinding has an influence on the reduction of the total bacterial count. To almost the same extent, the total number of bacteria can also be reduced by using the three-phase decanter 23. A large proportion of the germs can accumulate in the aqueous phase 27, whereby the number of germs in the oil phase can be brought into the range of 100 colony-forming units per gram.

Figure 3:
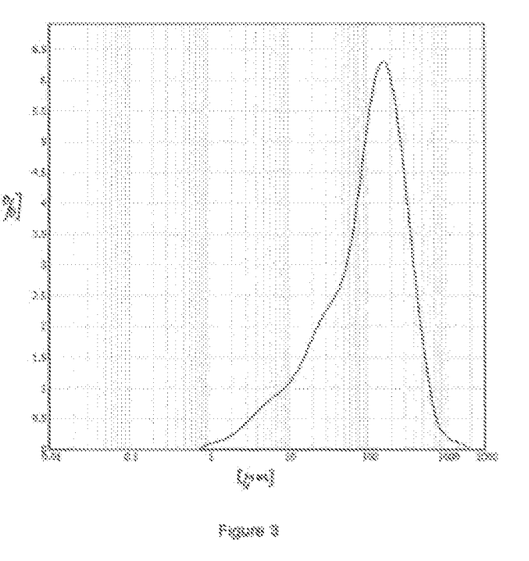
FIG. 3: a graph of particle size distribution with mint as raw material.
Figure 4:
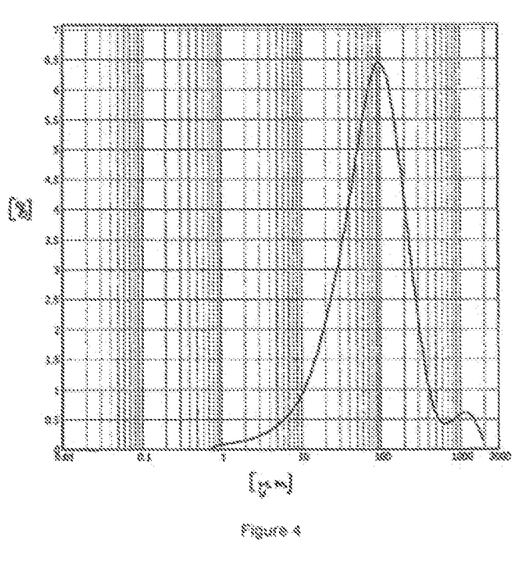
FIG. 4: a graph of particle size distribution with onion as raw material.

An analysis of the particle size distribution of oil phase 25 for mint and onion as raw materials has the graphs according to FIGS. 3 and 4 as a result. On the abscissa the particle diameters are plotted logarithmically in µm and on the ordinate the volume proportions are plotted linearly in %. The table below lists the diameter distributions, indicating how many vol % of the particles have a smaller diameter than the values given:

| Raw material | D(10%) | D(50%) | D(90%) |
|---|---|---|---|
| Mint | 18 µm | 83 µm | 273 µm |
| Onion | 14 µm | 117 µm | 353 µm |

The median value $X_{50.3}$ is less than 300 µm in the oil phase 25 of the process according to the invention, preferably less than 100 µm and especially preferably less than 20 µm.

The modal value $X_{h.3}$ is less than 300 µm in the oil phase 25 of the process according to the invention, preferably less than 100 µm and especially preferably less than 20 µm.

The sufficient comminution of the raw material by the ultra-fine grinding makes it possible to extract the value-determining ingredients, in particular flavouring substances and vitamins, with high efficiency. As already mentioned, ultra-fine grinding is also essential for the necessary reduction of bacterial counts in the oil phase 25. The process control must therefore be selected in such a way that an average PGD of less than 300 µm in the oil phase is reliably achieved. In this way, the desired effects on the reduction of bacterial counts and extraction efficiency can be achieved.

Figure 5:
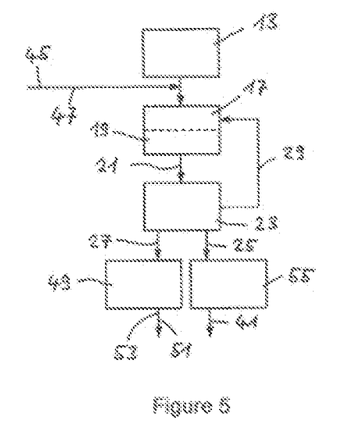
FIG. 5: a flowchart of a second embodiment of the method for the obtaining of valuable substances such as flavouring substances and vitamins.

FIG. 5 shows a flow chart of a second type of process for obtaining value-determining constituents. As an alternative to a vegetable oil as extractant, a concentrated salt solution 45 or a concentrated sugar solution 47 can also be used as extractant. It is also conceivable that the extractant is a mixture of a vegetable oil and a concentrated salt solution or a mixture of a vegetable oil and a concentrated sugar solution or a mixture of vegetable oil, sugar and salt solution.

The fresh foodstuff 13 is, as already in the first embodiment, finely ground with the extractant or the mixture of extractants, preferably in a first grinding stage 17 and in a second grinding stage 19.

The concentration of the sugar solution is between 40 and 60% (m/m) and preferably between 50 and 65% (m/m). The concentration of the salt solution is between 10 and 30% (m/m) and preferably between 15 and 25% (m/m). These concentrations of sugar and salt solution, which correspond at most to the saturation concentration, lead to an antimicrobial effect, since the concentrated salt or sugar solution leads to a driving concentration gradient at the cell membranes of the microorganisms. The microorganisms and germs are inevitably introduced by foodstuff 13, especially fresh food. The water contained in the cells of microorganisms and germs tries to get into the solution in order to balance the difference in concentration of sugar or salt. The cells burst and the concentration of living microorganisms or germs is reduced in mash 21. Enzymes are also inactivated.

After ultra-fine grinding, the mash 21, as in the first embodiment, is separated in a three-phase separator, for example in the form of a three-phase decanter centrifuge 23. Aqueous phase 27, which in addition to the dissolved salt or sugar also contains valuable substances, can be subjected to drying 49. The salt or sugar crystallises as a result of the drying process. The solids formed are enriched with valuable substances extracted into the aqueous phase. For example, an "essential salt" 53 or an "essential sugar" 51 can be produced, which are enriched with the valuable substance. The oil phase 25 produced in the three-phase decanter centrifuge 23 can be used as essential oil 41 after treatment 55, as already described in the first embodiment. In the second embodiment, the resulting oil phase 25 comes from the foodstuff.

In addition to the extractant, an active substance with an antioxidant effect can also be added to the foodstuff. This further improves the shelf life of the end products. The active substance is at least partially used up in mash 21 to ensure the antioxidant effect. The active substance may be vitamin C, vinegar, oxalic acid or tocopherol, for example, or may be contained in rosemary. Rhubarb juice or rhubarb juice concentrate is conceivable as a source of oxalic acid. The oxaloacetic acid formed from vinegar and oxalic acid can cause enzyme inhibition in mash 21. The oxaloacetic acid, which is not used up, can be precipitated with calcium to neutralize the acid effect.

LEGEND 13 starting material, raw material, fresh plants
15 vegetable oil
17 perforated disc mill, first grinding stage
19 toothed colloid mill, second grinding stage
21 mash
23 three-phase decanter centrifuge
25 oil phase
27 aqueous phase
29 solid phase
31 vacuum deaerator
33 aroma phase
35 heat treatment
37 cooling
39 centrifuge, 2 phase separator
41 essential oil
43 paste
45 salt solution
47 sugar solution
49 drying
51 essential sugar
53 essential salt
55 preparation

The invention claimed is:

1. A method for obtaining ingredients from a foodstuff, the method comprising:
    (a) providing the foodstuff;
    (b) adding an extractant;
    (c) grinding the foodstuff and the extractant into a mash; and
    (d) separating the mash into an extraction phase and a raffinate phase, wherein the extraction phase is an oil phase and the raffinate phase is a solid phase,
    wherein the foodstuff with the extractant is ultra-finely ground, the ultra-fine grinding being defined in that the foodstuff with the extractant is ground until the oil phase has an average particle size of less than 100 µm, and in that the mash is separated by a three-phase separator into the solid phase, the oil phase for obtaining an essential oil, and an aqueous phase,
    wherein the oil phase is freed of sediments and suspended matter in a 2-phase separator.

2. The method according to claim 1, wherein the extractant is a vegetable oil.

3. The method according to claim 1, wherein the extractant is a salt solution or a sugar solution.

4. The method according to claim 1, wherein the extractant is a mixture of two or three of the vegetable oil, the salt solution and the sugar solution.

5. The method according to claim 1, further comprising adding an additive having an antioxidant effect to the extractant, wherein the additive is vitamin C, vinegar, oxalic acid or tocopherol.

6. The method according to claim 1, wherein after the ultra-fine grinding—the oil phase is created from the mash in which fat-soluble ingredients comprising flavouring substances, vitamins and polyphenols are extracted, the aqueous phase is created in which germs and other water-soluble substances are enriched and the solid phase is created in which the solid residues remain.

7. The method according to claim 1, wherein the ultra-fine grinding is carried out in a toothed colloid mill, the grinding gap is less than 0.1 mm.

8. The method according to claim 1, wherein the ultra-fine grinding is carried out in two stages a first grinding stage and a second grinding stage.

9. The method according to claim 8, wherein the first grinding stage is performed in a perforated disc mill and the second grinding stage is performed in a toothed colloid mill.

10. The method according to claim 1, wherein the ultra-fine grinding is carried out at room temperature.

11. The method according to claim 1, wherein the foodstuff is supplied fresh or immediately after harvesting.

12. The method according to claim 1, wherein the oil phase is degassed and dewatered by a vacuum vent.

13. The method according to claim 1, wherein the temperature of the mash increases by 10 to 20° C. during ultra-fine grinding.

14. The method according to claim 1, wherein a reduction of the bacterial count and/or microbiological stabilisation is achieved by the ultra-fine grinding in the oil phase.

15. The method according to claim 1, wherein the formation and separation of the aqueous phase and/or the ultra-fine grinding reduces the bacterial count in the oil phase compared with the bacterial count of the oil phase in 2-phase separation.

16. The method according to claim 1, wherein the concentration of presumptive *Bacillus cereus* in the oil phase is reduced to less than 100 colony-forming units/g and the concentration of Enterobacteriaceae to less than 10 colony-forming units/g by formation and separation of the aqueous phase.

17. The method according to claim 1, wherein the method extracts at least 90% of fat-soluble vitamins from the foodstuff into the oil phase.

* * * * *